3,441,464
CARPET UNDERLAY AND METHOD OF MAKING THE SAME
Sidney D. Blue, New York, N.Y., assignor to Reeves Brothers, Inc., New York, N.Y., a corporation of New York
No Drawing. Continuation-in-part of application Ser. No. 236,657, Nov. 9, 1962. This application Dec. 28, 1966, Ser. No. 605,184
Int. Cl. B32b 5/06, 31/20
U.S. Cl. 161—67                    9 Claims

ABSTRACT OF THE DISCLOSURE

A method and the resulting article of forming a composite multilayer non-woven fiber-foam structure such as a carpet underlay including, passing a fiber batt and a layer of foam through a needle punching loom so that the foam is at least partially compressed and the fiber batt is needled onto and through said layer of foam and flame treating at least one side of the compressed foam so as to cause the protruding fiber ends to melt and undergo a characteristic beading and to simultaneously form a transient adhesive at the flamed surface of the foam. A layer of topping material such as a fabric, fiber batt or a sheet of vinyl polymer may be immediately laminated to the flamed surface before cooling and a woven scrim may be inserted between the batt and the foam before passing the assembly through the loom.

---

This application is a continuation-in-part of my copending application, Ser. No. 236,657, filed Nov. 9, 1962, now U.S. Patent 3,352,739, entitled, "Foam and Fiber Combination Product and Method of Making Same."

This invention relates to the production of carpet underlay using needle punching techniques. The invention provides an improved method for producing a composite, multilayer, non-woven polyolefin fiber/polyurethane foam structure which is particularly suitable for use as carpet underlay. Moreover, carpet underlay produced by the method of the invention may be used to fabricate highly serviceable and attractive yet relatively inexpensive needle loom non-woven carpets.

Using a composite, needle-punched, compressed foam/batt structure which had been formed by passing a batt of polyolefin fiber and a layer of polyurethane foam through a needle punching loom to partially compress the foam to a predetermined density and which, as a necessary consequence of the needle felting operation, contains a batt side (through which side the needling occurred) and a pile side from which protrude those fiber ends of the batt which had been needle-punched through the polyurethane foam layer, I have found that when either side of this composite, needle-punched, compressed foam/batt structure is flamed until the polyolefin fiber ends lying on or protruding from such side undergo a characteristic beading, under which conditions a transient adhesive simultaneously forms at the flamed surface of the foam, then upon cooling the flamed side the beaded fiber ends bond or interlock with the compressed foam at the points of fiber penetration and the compression of the foam layer is fixed at such predetermined density.

If the batt side of the composite, needle-punched, compressed foam/batt structure is flamed, then upon cooling the beaded fiber ends on such side bond with the compressed foam at the points of fiber penetration allowing the foam to pillow up at other points, which results in a waffle-like effect which, in turn, imparts an anti-skirt surface to the flamed batt side. If the pile side of the composite, needle-punched, compressed foam/batt structure is flamed, and a layer of topping material (such as a fabric, or a needle-punched fiber batt, or a sheet of a vinyl polymer) immediately laminated to the flamed pile side, then upon cooling the beaded fiber ends on such side bond with the compressed foam at the points of fiber penetration and also bond with the layer of topping material. Either way, the compression of the foam layer is fixed at such predetermined density, since the beaded fiber ends on the particular flamed side (either the batt side or the pile side) bond with the foam at the points of fiber penetration into the foam surface.

Because of the tenacity of the bond between the beaded fiber ends and the compressed foam, the fiber batt does not undergo the usual "piling" of fiber batts which have been needled into polyurethane foam but which have not been bonded to the foam. Increased strength and dimensional stability may be imparted to these composite structures by interposing a woven scrim (fabric, fiberglass or metal) between the fiber batt and the polyurethane foam layer prior to needling.

Based on these discoveries, the invention provides an improved method of producing a composite, multilayer, non-woven polyolefin fiber/polyurethane foam structure suitable for use as carpet underlay which comprises (a) passing a batt of polyolefin fiber and a layer of flexible polyurethane foam through a needle punching loom so that the thermoplastic fiber batt is needled onto and through the layer of polyurethane foam to partially compress the foam to a predetermined density and to form a composite, needle-punched, compressed foam/batt structure which contains (i) a batt side, through which side the needling occurred, and (ii) a pile side from which protrude those fiber ends of the batt which had been needle-punched through the polyurethane foam layer; and (b) flaming at least one side of the composite, needle-punched, compressed foam/batt structure to melt the polyolefin fiber ends lying on such side until such fiber ends undergo a characteristic beading and to simultaneously form a transient adhesive at the flamed surface of the foam, and then allowing the flamed side to undergo cooling, thereby (i) bonding such beaded fiber ends with the compressed foam at the points of fiber penetration, and (ii) fixing the compression of the foam layer at such predetermined density. The invention also contemplates certain products produced by this method.

To produce these composite, multilayer, non-woven polyolefin fiber/polyurethane foam structures in accordance with the method of the invention, the fiber batt must be composed primarily of polyolefin fiber, since these fibers melt upon flaming and undergo a characteristic beading (or "balling") at the fiber ends. Among those polyolefin fibers which have been found to be particularly suitable for use in the batt are polyethylene, polypropylene, and various interpolymers and block copolymers of ethylene and propylene. Other thermoplastic fibers may be selected for use in the batt in conjunction with polyolefin fiber, such as nylon, polyester (polyethylene terephthalate), and cellulosic fibers (such as rayon or cellulose triacetate). For best results, however, the batt should be composed of polypropylene fiber, which need not be first quality since the carpet underlay generally is not exposed to sunlight.

In accordance with the method of the invention, the fiber batt and a layer of flexible polyurethane foam (which may be either polyester- or polyether-derived) are passed through a needle punching loom so that the fiber batt is needled onto and through the layer of polyurethane foam, which results in partially compressing the foam, the degree of compression being dependent upon the density and depth of needle penetrations per square inch employed during the needling operation. Since the needling occurs through the batt and then into the foam layer, that side of the resultant composite, needle-punched, compressed foam/batt structure through which the needling occurred is termed the batt side. The other side of this structure is termed the pile side, since needling results into a pile-like protrusion of those fiber ends of the batt which had been needle-punched through the polyurethane foam layer.

Any commercially available needle felting equipment may be used in the needling operations, such as the needle felting machines (the terms "needle felting," "needle punching," and "needle loom" being interchangeably used herein) which are manufactured by James Hunter Machine Company, North Adams, Mass. The number of needle penetrations per square inch which are used to needle the batt to the polyurethane foam may vary widely depending upon the type of structure being produced. To compress the thickness of a ½-inch polyurethane foam layer by at least 50 percent, the needle loom should be used at from about 300 to about 400 needle penetrations per square inch.

The composite, needle-punched, compressed foam/batt structure is then flamed on a flame laminator so that the flame is directed to one side (batt side or pile side) of the structure, the rate at which this composite structure is passed through the flame laminator being such that the flamed side is exposed to the flame for a period of time which is just sufficient to cause the fiber ends lying on or protruding from such side to undergo a characteristic beading (which occurs at or above the fusion temperature of the fiber) and to simultaneously form a transient adhesive at the flamed surface of the foam (which probably occurs because of pyrolytic degradation of the foam surface to form a transitory isocyanate-rich zone on such surface). As the flamed side undergoes cooling, the beaded fiber ends are bonded and interlocked with the compressed foam at the points of fiber penetration, and the compression of the foam becomes fixed at that density to which the foam had been partially compressed upon needling.

When the pile side is flamed, then a layer of topping material (such as a fabric, or a fiber batt, or a sheet of vinyl polymer) should be immediately laminated to the flamed pile side, so that upon cooling the flamed pile side not only are the beaded fiber ends on the pile side bonded to the compressed foam at the points of fiber penetration but these beaded fiber ends are also bonded to the layer of topping material. When the batt side is flamed (with nothing being laminated to such surface) then upon cooling the beaded fiber ends on that side bond to the foam at the points of fiber penetration, allowing the foam to pillow up at other points and creating an anti-skid surface. The pile should be flamed if the structure is to be employed to produce a product which requires a topping layer, while the batt side should be flamed to produce a product (such as a carpet underlay for throw rugs, area rugs or mats) which requires an anti-skid surface. Irrespective of which side is flamed, however, the flaming results in (1) bonding the beaded fiber ends lying on or protruding from such flamed surface to the foam at the points at which such fibers penetrate the surface of the foam, and (2) fixing the compression of the foam at the particular density to which the foam layer was partially compressed as a result of the needling operation.

An improved technique has been developed for producing non-woven carpets using a carpet underlay produced in accordance with the method of the invention. Basically, this technique utilizes the carpet underlay, a woven scrim (wither fabric or metal), and a unique carpet topping, which is a composite, multilayer, non-woven fibrous structure. The carpet topping is produced by passing a batt of polyolefin fiber through a needle punching loom which, as a necessary consequence of the needle felting operation, creates (1) a smooth face, and (2) a pile face from which polyolefin fiber ends slightly protrude. This needle-punched polyolefin batt is then passed through a flame laminator so that the flame impinges on the pile face, the rate at which the needle-punched polyolefin batt is passed through the flame laminator being such that the pile face is exposed to the flame for a period of time which is just sufficient to cause the polyolefin fiber ends which protrude from the pile face to undergo a characteristic beading or balling (which occurs at or above the fusion temperature of the polyolefin) thereby partially fusing a zone of polyolefin fiber immediately adjacent to the fiber face and physically anchoring most of the polyolefin fiber in the first batt to such partially fused zone. A second fiber batt, preferably composed of polyolefin fiber, is then placed over the flamed pile face of the first batt, and the two layers passed through a needle punching loom so that the second batt is the uppermost layer on entering the needle punching loom. Needling of the second batt to the first batt (previously needle-punched and flamed) drives fibers of the second batt through the partially fused zone of the first batt, thereby forming a composite, multilayer, non-woven fibrous structure in which both batts are physically anchored to the partially fused zone of polyolefin fiber. As carpet topping, the exposed surfaces of this composite structure which is derived from the first batt as well as those protruding fibers of the second batt which had been needled through the first batt constitutes the pile face of the carpet topping while the exposed face of the composite structure which is derived solely from the second batt represents the smooth face of the carpet topping.

As described below, the method of the invention has been adapted for the manufacture of a carpet underlay consisting essentially of a composite, multilayer, non-woven polypropylene fiber/polyurethane foam structure. To illustrate the use of this carpet underlay in the fabrication of non-woven polypropylene carpet for throw rugs or area carpet, the following description also describes the method by which the carpet topping is produced as well as the method used for combining these elements (carpet underlay, scrim and carpet topping) into a non-woven polypropylene carpet:

Production of carpet underlay

A polypropylene fiber batt weighing from 4 to 5 ounces per square yard is used in the production of the carpet underlay, although the staple length and denier can be mixed and the fiber may be of second quality or reworked stock. The polyurethane foam used is a flexible polyether-type polyurethane foam having a thickness of ½ inch. This polypropylene batt should be the same width as or slightly wider than the polyurethane foam onto which it is to be needled. In the needling process, the polyurethane foam enters the needle loom lying on the feed apron and the batt feeds on top of the foam; the two elements are needled together using from about 350 to 400 penetrations per square inch with a penetration of ½ to ¾ inch. Under these conditions, the thickness of the foam is compressed by 50 to 60 percent.

After needling, the foam/batt is passed through a flame laminator at a rate of 30 yards per minute with the flame directed to the batt side of the structure. Fiber lying parallel to the surface of the foam will melt into beads which will retain the compression of the foam at the points of fiber penetration and allow the foam to pillow up at other points. The resultant waffle-like effect creates an anti-skid surface when placed in contact with flooring. The carpet underlay is now completed and may be placed in rolls prior to further use.

Production of carpet topping

Polypropylene batting weighing 8 ounces per square yard and composed of 15 denier x 6-inch polypropylene fiber having acceptable lightfastness may be used for both the first and second batts in the carpet topping. The first batt is passed through a needle punching loom and needled with 800 to 1,000 needle penetrations per square inch, using a penetration depth of from 7/16 to 9/16 inch and the most efficient running speed. After needling, the first batt is flamed on a flame laminator at a speed of 30 yards per minute, using compression. Under these conditions and with the flame directed to the pile face of the first batt, a zone of polypropylene fiber immediately adjacent to the pile face undergoes partial fusion, which is characterized by balling of the fiber ends protruding from the pile face.

The second batt may be the same or a contrasting color as the first batt. The second batt enters the needle loom such that it is placed on top of the previous needled first batt which, in turn, has its flame-fused face up and its smooth face down. The two batts are needled together using 1,600 penetrations per square inch and a penetration of 7/16 inch at the most efficient speed. The carpet topping is now completed and may be placed in rolls prior to further use.

Combining the carpet elements

Non-woven polypropylene carpet is produced by combining the three carpet elements, namely (1) the carpet underlay, (2) the carpet topping, and (3) a woven scrim of spun fiberglass having a mesh no finer than 10 x 10 per inch. The three separately rolled elements, i.e., carpet topping, scrim and carpet underlay, are mounted on a flame laminator such that the carpet topping will pass over the flame roll with the flame directed at its smooth face. Alternatively, a flame laminator with dual burners may be used, in which case one flame is directed at the smooth face of the carpet topping and the other flame is directed at the pile face of the carpet underlay. The carpet underlay should be mounted such that the fiber ends protruding from the foam (pile side) will be squeezed into the melted face of the carpet topping with the scrim interposed between the carpet topping and carpet underlay. After mounting the three separately rolled elements, the laminator is run at 30 yards per minute (normal squeeze) with the flame directed at the smooth face of the carpet topping, under which conditions the flamed face of the carpet topping will melt. This procedure results in the fiber ends of the carpet underlay being fused into the melted face of the carpet topping through openings of the scrim. Moreover, the melted polypropylene also bonds to the foam surface squeezed through the mesh opening and also bonds to the yarn of the scrim, probably by encapsulation. A collateral effect of melting the fibers on the smooth face of the topping is the fusing of the fibers throughout this face so that fibers from the second batt which protrude on the pile face (which is the exposed wearing surface of the carpet) will be locked into the structure.

Although the foregoing description illustrates the production of a composite, multilayer, non-woven polypropylene fiber/polyurethane foam carpet underlay in which the batt side is flamed in accordance with the method of the invention, as well as the use of this carpet underlay in fabricating a non-woven polypropylene carpet suitable for throw rugs and area rugs, the method of the invention is equally applicable to the production of a product in which the pile side is flamed and then immediately laminated to a layer of topping material.

I claim:

1. The method of producing a composite, multilayer, non-woven polyolefin fiber/polyurethane foam structure suitable for use as carpet underlay which comprises
    (a) passing a batt of polyolefin fiber and a layer of flexible polyurethane foam through a needle punching loom so that the polyolefin fiber batt is needled onto and through the layer of polyurethane foam to partially compress the foam to a predetermined density and to form a composite, needle-punched, compressed foam/batt structure which contains (i) a batt side, through which side the needling occurred, and (ii) a pile side from which protrude those fiber ends of the batt which had been needle-punched through the polyurethane foam layer; and
    (b) flaming at least one side of the composite, needle-punched, compressed foam/batt structure to melt the polyolefin fiber ends lying on such side until such fiber ends undergo a characteristic beading and to simultaneously form a transient adhesive at the flamed surface of the foam, and then allowing the flamed side to undergo cooling, thereby (i) bonding such beaded fiber ends with the compressed foam at the points of fiber penetration, and (ii) fixing the compression of the foam layer at such predetermined density.

2. The method of producing a composite, multi-layer, non-woven polyolefin fiber/polyurethane foam structure according to claim 1, in which the batt is composed of polypropylene fiber.

3. The method of producing a composite, multilayer, non-woven polyolefin fiber/polyurethane foam structure according to claim 1, in which a woven scrim is interposed between the batt of polyolefin fiber and the layer of flexible polyurethane foam prior to needling so that when the batt/scrim/foam is passed through the needle punching loom the batt is needled onto and through the layer of polyurethane foam through the interposed scrim to partially compress the foam to a predetermined density and to form a composite, needle-punched, compressed foam/batt structure which contains (i) a batt side, through which side the needling occurred, and (ii) a pile side from which protrude those fiber ends of the batt which had been needle-punched through the interposed scrim and the polyurethane foam layer.

4. The method of producing a composite, multilayer, non-woven polyolefin fiber/polyurethane foam structure according to claim 1, in which the batt side of the composite, needle-punched, compressed foam/batt is flamed to melt the polyolefin fiber ends lying on the batt side until such fiber ends undergo a characteristic beading and to simultaneously form a transient adhesive at the flamed surface of the foam, and the flamed batt side then allowed to undergo cooling, thereby bonding such beaded fiber ends with the compressed foam at the points of fiber penetration, fixing the compression of the foam at such predetermined density, and allowing the foam to pillow up at other points, the resultant composite, multilayer, non-woven polyolefin fiber/polyurethane foam structure being characterized by an anti-skid surface on the flamed batt side.

5. The method of producing a composite, multilayer, non-woven polyolefin fiber/polyurethane foam structure according to claim 1, in which the pile side of the composite, needle-punched, compressed foam/batt is flamed to melt the polyolefin fiber ends protruding from the pile side until such fiber ends undergo a characteristic beading and to simultaneously form a transient adhesive at the flamed surface of the foam, the flamed pile side is then immediately laminated to a layer of topping material, and the flamed pile side then allowed to undergo cooling, thereby (i) bonding such beaded fiber ends with the compressed foam at the points of fiber protrusion, (ii) bonding the layer of topping material to the pile side of the composite, needle-punched, compressed foam/batt structure, and (iii) fixing the compression of the foam at such predetermined density.

6. The method of producing a composite, multilayer, non-woven polypropylene fiber/polyurethane foam structure suitable for use as carpet underlay which comprises
    (a) passing a batt of polypropylene fiber and a layer of polyurethane foam through a needle-punching loom using from about 300 to about 400 needle penetrations per square inch so that the polypropylene batt is needled onto and through the layer of polyurethane foam to partially compress the thickness of the foam by at least 50 percent and to form a composite, needle-punched, compressed foam/batt structure which contains (i) a batt side, through which side the needling occurred, and (ii) a pile side from which protrude those fiber ends of the polypropylene batt which had been needle-punched through the polyurethane foam layer; and (b) flaming the batt side of the composite, needle-punched, compressed foam/batt structure to melt the polypropylene fiber ends lying on the batt side until such fiber ends undergo a characteristic beading and to simultaneously form a transient adhesive at the flamed surface of the foam, and then allowing the flamed batt side to undergo cooling, thereby (i) bonding such beaded fiber ends with the compressed foam at the points of fiber penetration, (ii) fixing the compression of the foam layer at such density, and (iii) allowing the foam to pillow up at other points, the resultant composite, multilayer, non-woven polypropylene fiber/polyurethane foam structure being suitable for use as carpet underlay and characterized by (i) an anti-skid surface on the flamed batt side, and (ii) a pile face on the pile side.

7. The method of producing a composite, multilayer, non-woven polypropylene fiber/polyurethane foam structure suitable for use as carpet underlay which comprises (a) passing a batt of polypropylene fiber and a layer of polyurethane foam through a needle-punching loom using from about 300 to about 400 needle penetrations per square inch so that the polypropylene batt is needled onto and through the layer of polyurethane foam to partially compress the thickness of the foam by at least 50 percent and to form a composite, needle-punched, compressed foam/batt structure which contains (i) a batt side, through which side the needling occurred, and (ii) a pile side from which protrude those fiber ends of the polypropylene batt which had been needle-punched through the polyurethane foam layer; and (b) flaming the pile side of the composite needle-punched, compressed foam/batt structure to melt the polypropylene fiber ends protruding from the pile side until such fiber ends undergo a characteristic beading and to simultaneously form a transient adhesive at the flamed surface of the foam, immediately laminating the flamed pile side to a layer of topping material, and then allowing the flamed pile side to undergo cooling, thereby (i) bonding such beaded fiber ends with the compressed foam at the points of fiber protrusion, (ii) bonding the layer of topping material to the pile side of the composite, needle-punched, compressed foam/batt structure, and (iii) fixing the compression of the foam layer at such density.

8. The composite, multilayer, non-woven polyolefin fiber/polyurethane foam structure formed by (a) passing a batt of polyolefin fiber and a layer of flexible polyurethane foam through a needle punching loom so that the polyolefin fiber batt is needled onto and through the layer of polyurethane foam to partially compress the foam to a predetermined density and to form a composite, needle-punched, compressed foam/batt structure which contains (i) a batt side, through which side the needling occurred, and (ii) a pile side from which protrude those fiber ends of the batt which had been needle-punched through the polyurethane foam layer; and (b) flaming the batt side of the composite, needle-punched, compressed foam/batt structure to melt the polyolefin fiber ends lying on the batt side until such fiber ends undergo a characteristic beading and to simultaneously form a transient adhesive at the flamed surface of the foam, and then allowing the flamed batt side to undergo cooling, thereby (i) bonding such beaded fiber ends with the compressed foam at the points of fiber penetration, (ii) fixing the compression of the foam layer at such predetermined density, and (iii) allowing the foam to pillow up at other points, the resultant composite, multilayer, non-woven polyolefin fiber/polyurethane foam structure being suitable for use as carpet underlay and characterized by (i) an anti-skid surface on the flamed batt side, and (ii) a pile face on the pile side.

9. The composite, multilayer, non-woven polypropylene fiber/polyurethane foam structure formed by (a) passing a batt of polypropylene fiber and a layer of flexible polyurethane foam through a needle punching loom using from about 300 to about 400 needle penetrations per square inch so that the polypropylene batt is needled onto and through the layer of polyurethane foam to partially compress the thickness of the foam by at least 50 percent and to form a composite, needle-punched, compressed foam/batt structure which contains (i) a batt side, through which side the needling occurred, and (ii) a pile side from which protrude those fiber ends of the polypropylene batt which had been needle-punched through the polyurethane foam layer; and (b) flaming the pile side of the composite, needle-punched, compressed foam/batt structure to melt the polypropylene fibers ends lying on the pile side until such fibers ends undergo a characteristic beading and to simultaneously form a transient adhesive at the flamed surface of the foam, immediately laminating the flamed pile side to a layer of topping material, and then allowing the flamed pile side to undergo cooling, thereby (i) bonding such beaded fiber ends with the compressed foam at the points of fiber protrusion, (ii) bonding the layer of topping material to the pile side of the composite, needle-punched, compressed foam/batt structure, and (iii) fixing the compression of the foam layer at such density.

References Cited

UNITED STATES PATENTS

| 2,429,486 | 10/1947 | Reinhardt _____ 156—148 XR |
| 3,122,141 | 2/1964 | Crowe. |
| 3,324,609 | 6/1967 | Stein et al. |

FOREIGN PATENTS 646,875    8/1962    Canada.

ROBERT F. BURNETT, *Primary Examiner.*

WILLIAM A. POWELL, *Assistant Examiner.*

U.S. Cl. X.R.

161—81, 93, 124, 154, 159; 156—82, 148